Nov. 8, 1932. E. G. BUCHMANN 1,887,257
EXPANDER SPRING FOR PISTON RINGS
Filed April 23, 1932
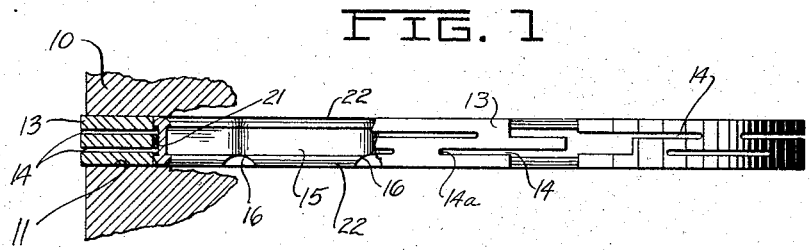
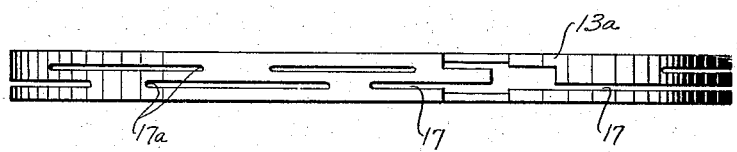
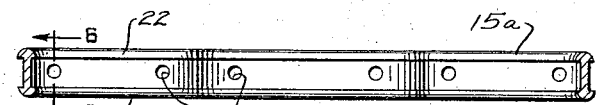
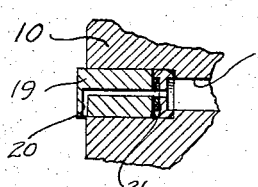
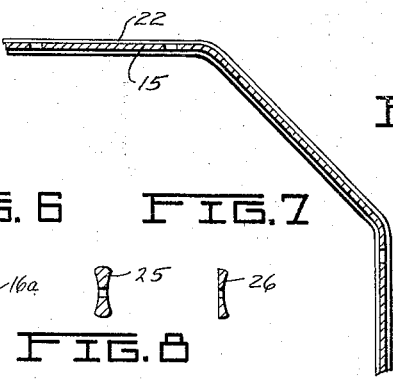
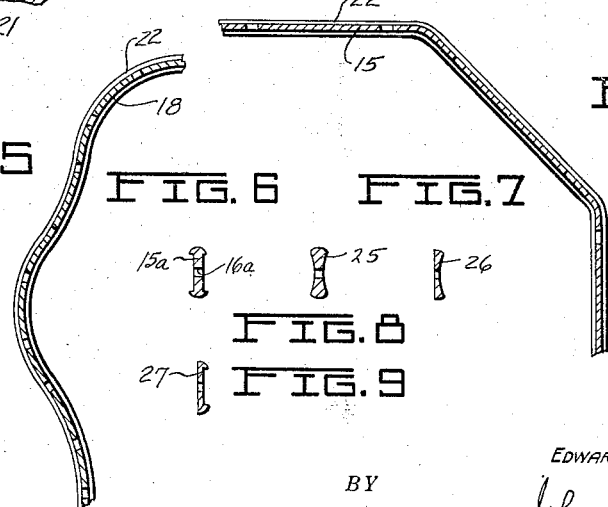
INVENTOR
EDWARD G. BUCHMANN
BY
John A. Bommhardt
ATTORNEY Patented Nov. 8, 1932

1,887,257

UNITED STATES PATENT OFFICE

EDWARD G. BUCHMANN, OF EAST ST. LOUIS, ILLINOIS

EXPANDER SPRING FOR PISTON RINGS

Application filed April 23, 1932. Serial No. 607,106.

My invention relates to expander springs having channels and oil passages, trans-split piston rings with oil apertures and trans-split piston rings of that type which are slotted so as to contract in width when assembled into the annular piston ring groove of the piston.

This invention is in part, an improvement on my pending application filed October 1, 1931, Serial No. 566,212.

One object of the invention is to provide means for registering oil vents of expander springs with all of the oil passages in the entire circumference of an annular piston ring groove of a piston.

Another object is to provide a novel form of expander spring whose cross-section is similar to that of the letter I and forms annular oil channels for the free passage of oil around the entire circumference of the piston ring groove, and said spring is normalized, after forming the bends, by heat treating to reset the spring tension of the metal.

Still another object is to provide an expander spring that is more resilient against the moving element or piston ring, this object being attained by having the outer curvature of the spring of a greater radius than the inner curvature, which prevents and excess of friction between the piston ring and the cylinder wall thus causing a minimum of wear on the said cylinder wall.

Other objects and advantages will be noted from the following description and the accompanying drawing, in which:

Figure 1 is a partial section and elevation of a trans-split piston ring and expansion spring; Fig. 2 is a side elevation of a modified form of the piston ring shown in Fig. 1; Fig. 3 is a sectional view of a modified form of the expansion spring shown in Fig. 1; Fig. 4 is a longitudinal sectional fragment of Fig. 3; Fig. 5 is a sectional fragment similar to Fig. 4 but with a curved surface; Fig. 6 is a section taken on line 6—6 of Fig. 3; Fig. 7 is a modified form of Fig. 6 with one side concave and the other side straight; Fig. 8 is a modified form of Fig. 7 showing both sides concave; Fig. 9 is a modification of Fig. 6 similar to Fig. 7; Fig. 10 is a fragmentary section of a modification of Fig. 1 showing a section of a piston ring and expander spring.

Referring to the drawing: A piston 10 having one or more annular piston ring grooves of which one groove 11 has an oil passage 12 therein, leading to the interior of the piston as usual, with a piston ring 13 having oil apertures 14, assembled or mounted within the said groove 11. Mounted within the groove, behind the piston ring 13, is an expander spring 15 with oil vents 16 cut into the edge of said expander spring to receive the flow of oil from the oil passages in the piston ring 13 and convey the oil to the passages 12 and into the hollow piston 10.

The modification shown in Fig. 2 has a difference only in the piston ring 13a which has slots 17 cut opposite each other instead of being on each side of the tongue as are slots or oil apertures 14 in Fig. 1. These slots are milled with a radius at 14a and 17a to prevent sharp corners and thus avoid breaking.

The modification shown in Fig. 3 has a difference only in the oil vents 16a which are on the middle line of the expander spring 15a instead of being in the lower edge as shown in Fig. 1 at 16.

Figs. 4 and 5 illustrate different bent forms of the springs, the former being hexagonal and the latter being waved or corrugated lengthwise.

The modified form of expander spring 18 shown in Fig. 6 has a difference in shape only, as have the modified forms 25, 26 and 27 shown in Figs. 7, 8 and 9 respectively, all being characterized by annular channels or concavities on one or both sides.

The piston ring 19 shown in Fig. 10 is different only in the position of the oil passage 20.

The inner surface 21 of the piston rings 13 or 19 is rough machined or file-like and engages the ribs or curved surface 22 of the expander springs 15 and 15a and thus prevents the piston rings 13 or 19 from collapsing in an axial direction, and also prevent a rocking motion of the piston ring within the piston ring groove 11.

Among the advantages of the types described are the following: After the springs are bent or formed they are "normalized" by heat treatment so as to reset the spring tension of the metal, and the outer curvatures being of greater radius than the inner, produces a more resilient expander spring, that is, one that acts with more resiliency against the piston ring, and the greater the resiliency of the spring the less the pressure against the piston ring, with less friction of the ring against the cylinder wall, and consequently less wear of the cylinder wall.

The cross-section of the spring, being somewhat like the letter I, or the modifications shown, forms longitudinal oil channels for the free passage of oil around the full circumference of the ring and the groove, and the ports or openings in the spring allow this oil to freely flow to the passages leading to the inside of the piston. This is desirable because manufacturers of pistons differ as to the number of passages leading from the groove. The present spring is believed to be the first expander spring to disclose means for uncovering all of the oil passages around the full circumference of the piston ring groove.

An improved feature of the ring itself is that a double tongue and groove joint is provided, thereby doubly sealing the split in the ring against loss of compression and gas leaks.

A further feature of advantage is that the present ring is slotted with a milling cutter so as to form the slots without sharp ends or corners, thereby avoiding the breaking or separation of the piston ring into sections, which is apt to occur with rings made of light gray iron slotted with a cutter producing sharp ends or corners, which readily break when in use, or cause the middle part to separate from the top and bottom parts.

The inner surface 21 of the ring is rough machined, or made somewhat similar to a file, and this roughened surface contacts with the enlarged ribs or edges of the spring and prevents the rocking or collapsing of the piston ring in an axial direction, which would otherwise be apt to occur in consequence of the drag of the ring against the cylinder wall on the in and out stroke of the piston.

It will be understood that the passages 15, or concave side walls of the spring, together with the notches 16 or holes 16a permit a relatively free flow of oil through and around the springs.

I claim:

1. An expander spring for piston rings, having an oil channel extending along one side thereof and oil ports in the spring communicating with said channel.

2. An expander spring for piston rings, having oil channels extending along opposite sides thereof and oil ports therein connecting said channels.

3. An expander spring for piston rings, substantially I-shaped in cross section.

4. An expander spring for piston rings, thickest at its longitudinal edges, thereby forming a longitudinal channel extending around the spring between said edges.

5. An expander spring for piston rings, thickest along its longitudinal edges, and thinnest between said edges, forming longitudinal passages on opposite sides, and ports connecting said passages.

6. An expander spring as in claim 5, said ports extending through the thin portions.

7. The combination stated in claim 5, said ports extending through one of the thickest edges.

8. The combination with a slotted piston ring having a roughened inner surface, of an expander spring having edges engaging said surface to prevent axial compressing of the ring.

9. The combination with a piston ring having upper and lower roughened surfaces extending around the inside thereof, of an expander spring having projecting edges engaging said roughened surfaces to prevent axial compression of the ring.

10. A trans-split slotted piston ring flexible on the width, with the slots beveled at the ends thereof, having a tongue and groove joint, and the piston ring having a roughened inner surface, of an expander spring having edges engaging said surface to prevent axial compression on the width of the ring, said expander spring having oil passages.

In testimony whereof, I do affix my signature.

EDWARD G. BUCHMANN.